(12) United States Patent
Kodialam et al.

(10) Patent No.: US 12,255,821 B2
(45) Date of Patent: Mar. 18, 2025

(54) TELEMETRY-BASED SEGMENT ROUTING USING MACHINE LEARNING

(71) Applicant: Nokia Solutions and Networks Oy, Espoo (FI)

(72) Inventors: Muralidharan Kodialam, Austin, TX (US); TV Lakshman, Morganville, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 13 days.

(21) Appl. No.: 18/336,675

(22) Filed: Jun. 16, 2023

(65) Prior Publication Data

US 2024/0430202 A1 Dec. 26, 2024

(51) Int. Cl.
H04L 47/122 (2022.01)
G06N 3/084 (2023.01)
H04L 43/0882 (2022.01)

(52) U.S. Cl.
CPC .......... *H04L 47/122* (2013.01); *G06N 3/084* (2013.01); *H04L 43/0882* (2013.01)

(58) Field of Classification Search
CPC .... H04L 47/122; H04L 43/0882; G06N 3/084
See application file for complete search history.

(56) References Cited

U.S. PATENT DOCUMENTS

| 10,277,476 B2 * | 4/2019 | Mermoud | H04L 47/365 |
| 2015/0195171 A1 * | 7/2015 | Mermoud | H04L 43/106 370/253 |
| 2016/0294702 A1 | 10/2016 | Kodialam et al. | |
| 2021/0304061 A1 * | 9/2021 | Kolar | G06F 11/3447 |
| 2022/0414500 A1 * | 12/2022 | Yadav | H04L 41/16 |

(Continued)

FOREIGN PATENT DOCUMENTS

CN 109194577 A 1/2019

OTHER PUBLICATIONS

Haeri et al., "A Predictive Q-Learning Algorithm for Deflection Routing in BUffer-less Networks", IEEE International Conference on Systems, Man, and Cybernetics, IEEE Publishing, Oct. 1, 2013.*

(Continued)

*Primary Examiner* — Todd L Barker
(74) *Attorney, Agent, or Firm* — Mintz Levin Cohn Ferris Glovsky and Popeo, P.C.

(57) ABSTRACT

In some embodiments, there may be provided a method that includes receiving, as a first input to a machine learning model, a measured link load; receiving, as a second input to the machine learning model, information indicating a network topology; receiving, as a third input to the machine learning model, at least one deflection parameter; learning, by the machine learning model, a first output to provide at least one updated deflection parameter, wherein the at least one updated deflection parameter indicates the fractional amount of traffic that is to be carried between the source node and the destination node and deflected through the intermediate node; and learning, by the machine learning model, a second output to provide dual variables that serve as a surrogate for a traffic matrix that could have generated the measured link load that is measured for the link of the network.

16 Claims, 9 Drawing Sheets

(56) References Cited

U.S. PATENT DOCUMENTS

2023/0198855 A1* 6/2023 Ganesan ............... H04L 41/145
706/10

OTHER PUBLICATIONS

Azzouni et al., "NeuRoute: Predictive dyamic routing for software-defined networks", 2017 13th International Conference on Network and Service Management, Nov. 26, 2017, IEEE Publishing.*

Liu et al., "Automated Traffic Engineering in SDWAN: Beyond Reinforcement Learning", IEEE infocom 2020—IEEE Conference on Computer Communications Workshops, IEEE Publishing, Aug. 7, 2020.*

Kodialam, M. et al., "Network Link Weight Setting: a Machine Learning Based Approach," IEEE INFOCOM 2022—IEEE Conference on Computer Communications, May 2, 2022, pp. 2048-2057.

Extended European Search Report issued in European Application No. 24181434.2-1215, mailed Oct. 17, 2024, 12 pages.

* cited by examiner

Receiving, as a first input to a machine learning model, a measured link load that is measured for a link of a network 305

Receiving, as a second input to the machine learning model, information indicating a network topology of the network 307

Receiving, as a third input to the machine learning model, at least one deflection parameter, wherein the at least one deflection parameter indicates a fractional amount of traffic that is currently being carried between a source node and a destination node and deflected through an intermediary node 309

Learning, by the machine learning model, a first output to provide at least one updated deflection parameter, wherein the at least one updated deflection parameter indicates the fractional amount of traffic that is to be carried between the source node and the destination node and deflected through the intermediate node 311

Learning, by the machine learning model, a second output to provide Dual variables that serve as a surrogate for a traffic matrix that could have generated the measured link load that is measured for the at least one link of a network 313

FIG. 3

TELEMETRY-BASED SEGMENT ROUTING USING MACHINE LEARNING

FIELD

The subject matter described herein relates to networking and machine learning.

BACKGROUND

Machine learning (ML) models may learn via training. The ML model may take a variety of forms, such as an artificial neural network (or neural network, for short), decision trees, and/or the like. The training of the ML model may be supervised (with labeled training data), semi-supervised, or unsupervised. When trained, the ML model may be used to perform an inference task.

SUMMARY

In some embodiments, there may be provided a method that includes receiving, as a first input to a machine learning model, a measured link load that is measured for a link of a network; receiving, as a second input to the machine learning model, information indicating a network topology of the network; receiving, as a third input to the machine learning model, at least one deflection parameter, wherein the at least one deflection parameter indicates a fractional amount of traffic that is currently being carried between a source node and a destination node and deflected through an intermediary node; learning, by the machine learning model, a first output to provide at least one updated deflection parameter, wherein the at least one updated deflection parameter indicates the fractional amount of traffic that is to be carried between the source node and the destination node and deflected through the intermediate node; and learning, by the machine learning model, a second output to provide dual variables that serve as a surrogate for a traffic matrix that could have generated the measured link load that is measured for the link of the network.

In some variations, one or more of the features disclosed herein including the following features can optionally be included in any feasible combination. The network topology may represent an amount of flow in one or more links of the network, the amount of flow caused by one unit of flow sent between two nodes of the network. The learning of the first and second output may minimize an objective function comprising the dual variables, the at least one deflection parameter, the measured link load, and a penalty that enforces at least one constraint on the dual variables, and/or wherein the minimization of the objective function provides a set of deflection parameter for segment routing over the network. The learning of the first output may repeat using the at least one updated deflection parameter as the third input. The dual variables serve a surrogate for at least one traffic matrix that provides a minimum of a maximum link utilization of a first link given the measured link load for a second link. The learning of the second output may repeat to provide an update to the dual variables, the updated dual variables using a different pair of links for the first link and the second link. The machine learning model may include a first layer of inputs that receive at least the first input, the second input, and the third input, an intermediate layer, and an output layer comprising an objective function.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIG. 3 depicts an example of a process for determining a routing scheme using machine learning, in accordance with some embodiments;

Figure 1A:
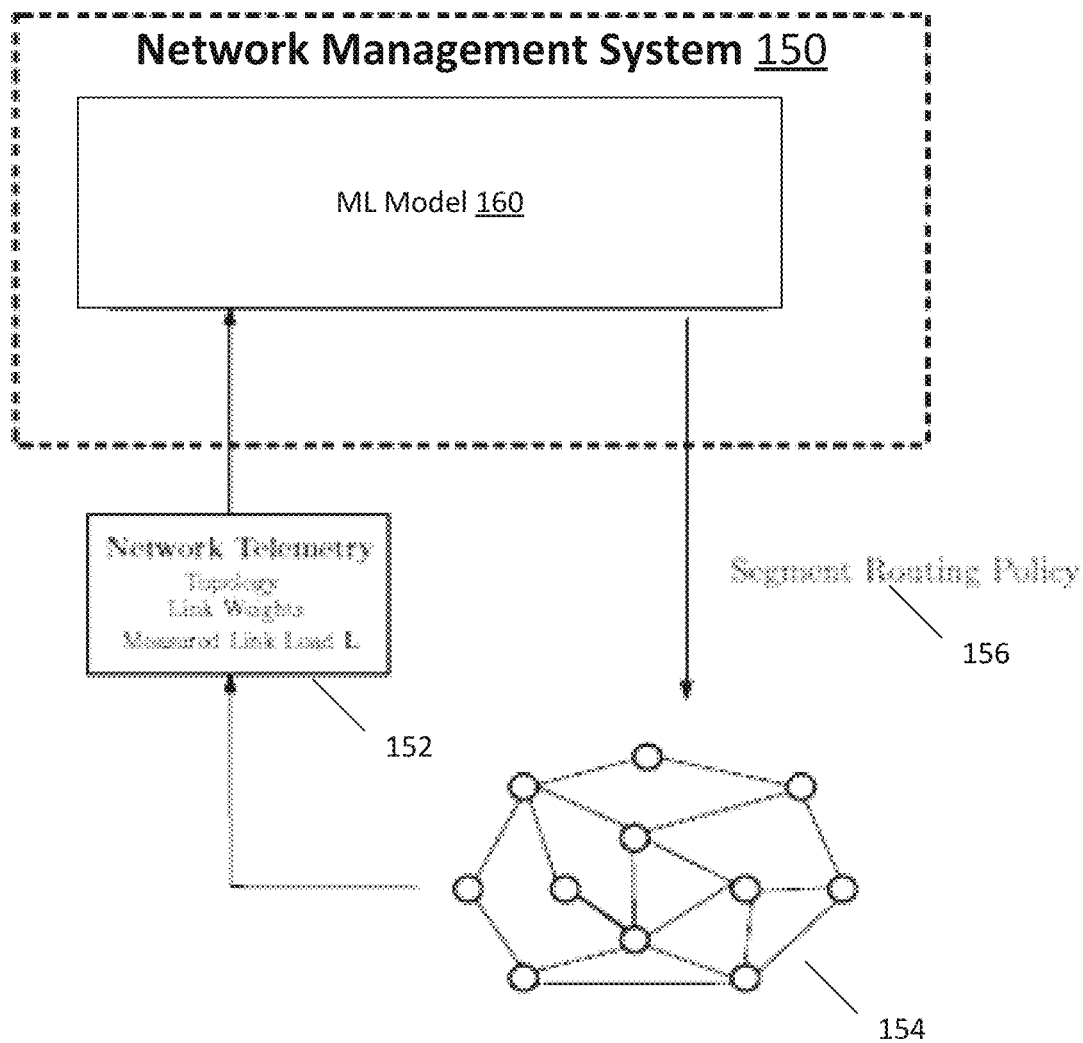
FIG. 1A depicts an example of a network management system including a machine learning (ML) model, in accordance with some embodiments.

Like labels are used to refer to same or similar items in the drawings.

DETAILED DESCRIPTION

With telemetry based routing, measurements are collected from time to time at an apparatus, such as a network management system. For example, the network management system may be a centralized management system that collects these measurements, such as link load measurements and/or the like. The network management system may also collect other information, such as the topology of the network ("network topology"), capacities of the links in the network ("link capacities"), the current routing paths being used to route traffic from a given source to a destination, and/or the like. Unlike link load measurements that are collected and measured as they can change relatively frequently over time, these other measurements can be less dynamic and may be known (or knowable) to the network management system. Given the link load measurements and the other information, the network management system may attempt to determine a routing policy (also referred to as a routing scheme) that minimizes congestion in the network ("network congestion"). The amount of network congestion may be measured using a maximum amount of link utilization on a given link.

FIG. 1A depicts an example of a network management system 150 that collects, at 152, telemetry information, such as network topology, link weights, measured link load measurements, and/or the like, about a network 154, and then the network management system outputs, at 156, a routing policy, such as a routing policy for segment routing ("segment routing policy") for the network 154. The network 154 may include n nodes (depicted as circles) connected via m physical links (depicted as lines between the nodes). Although FIG. 1A depicts an example a network 156, this is merely an example as other quantities of nodes, links, and their configuration may be implemented as well.

The traffic carried between a source node i and destination node j may be referred to a $d_{ij}$. Routing on each hop between a source node and a destination node may use a routing protocol, such as equal-cost multi-path routing (ECMP), for example. In the case of ECMP for example, $\beta_{ij}(l)$ represents the amount of flow in a link l if one unit of flow is sent from node i to node j.

In the example of FIG. 1A, the network management system 150 comprises one or more machine learning (ML) models, such as ML model 160 that determines a routing scheme (e.g., routing parameters) that minimize a maximum link utilization for any traffic matrix that could have resulted in a measured link load L(l). The measured link load L on a link l is referred to as L(l). In other words, given the measured link load L(l) on link l, the ML model 160 determines the segment routing parameters $x_{ij}^k$ that minimize the maximum link utilization (e.g., minimizes congestion on link l) across any of the traffic matrices that could have resulted in the measured link load L(l)).

With respect to link utilization, the routing parameters $g_{ij}^k$ (l) can denote a flow on a link l when one unit of flow is sent from a source node i to destination node j through an intermediate node k. And the flow $g_{ij}^k$ (l) may be in terms of the ECMP parameters βij(l) as follows:

$$g_{ij}^k(l) = \beta_{ik}(l) + \beta_{kj}(l) \qquad \text{Equation 1.}$$

And the measured link load L(l) may be expressed as $$\sum_i \sum_j \sum_k g_{ij}^k(l) \alpha_{ij}^k d_{ij} = L(l) \forall l, \qquad \text{Equation 2}$$

wherein $g_{ij}^k$ (l) denotes an amount of flow on a link l when one unit of flow is sent from a source node i to destination node j through an intermediate node k, the current segment routing parameters are represented by $\alpha_{ij}^k$, and $d_{ij}$ denotes the traffic carried between a source node i and destination node j. The values for βij(l) (as well as the corresponding $g_{ij}^k$(l)), $\alpha_{ij}^k$, and L(l)) are known to the network management system 150 but $d_{ij}$ (which is the traffic carried between a source node i and a destination node j) may not be known to the network management system 150.

Moreover, the specific traffic matrices formed by $d_{ij}$ cannot be determined from the measured link loads L(l) as the solution set of traffic matrices is unsolvable (e.g., or infinite) given the measure link load. For example, given the underlying, physical routing of the traffic flow $\beta_{ij}(l)$ (or $g_{ij}^k$(l)), a current segment routing scheme (e.g., dynamic segment routing (DSR), secured DSR (SDSR)) $\alpha_{ij}^k$, and a current, measured, link load L(l), the set of traffic matrices P(α, g, L) may be expressed as follows:

$$\sum_i \sum_j \sum_k g_{ij}^k(l) \alpha_{ij}^k d_{ij} = L(l) \forall l, \qquad \text{Equation 3}$$

wherein the set of traffic matrices P(α, g, L) denote the set of traffic matrices that satisfies this equation, while the number of variables in the set of traffic matrix is $O(n^2)$ and the number of constraints is O(m), so there can be an infinite number of traffic matrices in the set P(α, g, L).

In some embodiments, the network management system 150 comprising the at least one machine learning model 160 may be used to determine (using at least the measured link load L(l) on link l) a routing policy (also referred to as a routing scheme and/or segment routing scheme) comprising segment routing parameters $x_{ij}^k$ (or $\alpha_{ij}^k$) that minimize a maximum link utilization across, or for any, traffic matrix that could have resulted in the measured link load. As noted above, the $\beta_{ij}(l)$ (or $g_{ij}^k$(l)) represent whether a given link l is physically carrying any traffic flow (e.g., underlay routing using for example a shortest path first scheme) while a represent a current overlay routing scheme using segments.

Consider, however, that the ML model's 160 optimization problem may be structured to determine the traffic matrix in P(α,g,L) that maximizes the load on link l' where different traffic matrices in P(α, g, L) might maximize the flow on link l' for different links l', but the dual to these optimization problems are used to find the routing policy (e.g., $\alpha_{ij}^k$ which is also referred to as $x_{ij}^k$) that minimizes the maximum link load for any traffic matrix in P(α, g, L). Thus, the minimization of the objective function provides a set of deflection parameters (e.g., $x_{ij}^k$) for segment routing over the network.

Regarding the maximum link utilization on a link l', $x_{ij}^k$ denotes a segment routing policy (e.g., scheme) that minimizes the maximum link utilization for any traffic matrix in P(α, g, L). The traffic matrix in P(α, g, L) that maximizes the flow on link l' can be formulated as the following optimization problem:

$$\max \sum_i \sum_j \sum_k g_{ij}^k(l') x_{ij}^k d_{ij} \qquad \text{Equations 4-5}$$

$$\sum_i \sum_j \sum_k g_{ij}^k(l) \alpha_{ij}^k d_{ij} = L(l) \forall l,$$

wherein the variables in the traffic matrix are $d_{ij}$, and $x_{ij}^k$ is a segment routing policy (also referred to as $\alpha_{ij}^k$) and is independent of the traffic matrix $d_{ij}$.

But the dual to the noted maximum link utilization on a link l' may be implemented using dual variables π (l, l'). The dual here is derived from the primal, maximization of Equations 4-5, such that the variables in the primal become constraints in the dual, the constraints in the primal becomes variables in the dual, and objective direction is inversed, so the maximum in the primal becomes a minimum in the dual. The dual variables π (l, l') are associated with the link measurement constraint (e.g., measured link load L(l)), so the dual can be written as $$\min \sum_l L(l) \pi(l, l') \qquad \text{Equations 6-7}$$

$$\sum_l \sum_k g_{ij}^k(l) \alpha_{ij}^k \pi(l, l') \leq \sum_k g_{ij}^k(l') x_{ij}^k \forall i, j.$$

Moreover, $x_{ij}^k$ satisfies the following linearity constraint $$\sum_k x_{ij}^k = 1 \quad \forall i, j \qquad \text{Equations 8-9}$$

$$x_{ij}^k \geq 0 \quad \forall i, j.$$

The ML model's 160 objective function of the dual is a minimum (min) of $\Sigma_l L(l) \pi(l, l')$, which is equal to a primal objective function (which is a maximum utilization of link l'), so the objective function is as follows:

$$\min \max_{\ell'} \sum_{\ell} L(\ell) \pi(\ell, \ell') \quad \text{Equations 10-13}$$

$$\sum_{\ell} \sum_{k} g_{ij}^k(\ell) \alpha_{ij}^k \pi(\ell, \ell') \leq \sum_{k} g_{ij}^k(\ell') x_{ij}^k \, \forall \, i, j, \ell'$$

$$\sum_{k} x_{ij}^k = 1 \quad \forall \, i, j$$

$$x_{ij}^k \geq 0 \quad \forall \, i, j,$$

which can be expressed as follows to transform the objective function so that it is linear:

$$\min \max_{\ell'} \sum_{\ell} L(\ell) \pi(\ell, \ell') \quad \text{Equations 14-15}$$

$$\sum_{\ell} \sum_{k} g_{ij}^k(\ell) \alpha_{ij}^k \pi(\ell, \ell') \leq \sum_{k} g_{ij}^k(\ell') \left[ \frac{e^{\alpha x_{ij}^k}}{\sum_p e^{\alpha x_{ij}^p}} \right] \, \forall \, i, j, \ell'.$$

And, an activation function (e.g., rectified linear unit, ReLU (x)) of the ML model 160 may be denoted by $x^+$, so the determination of an optimal routing scheme $x_{ij}^k$ may be expressed as follows:

$$\min \max_{\ell'} \sum_{\ell} L(\ell) \pi(\ell, \ell') + \quad \text{Equation 16}$$

$$\lambda \sum_{i,j} \left( \sum_{\ell, k} g_{ij}^k(\ell) \alpha_{ij}^k \pi(\ell, \ell') - \sum_{k} g_{ij}^k(\ell') \left[ \frac{e^{\alpha x_{ij}^k}}{\sum_p e^{\alpha x_{ij}^p}} \right] \right)^+,$$

wherein the value of λ is chosen to ensure that the constraint $$\sum_{\ell} \sum_{k} g_{ij}^k(\ell) \alpha_{ij}^k \pi(\ell, \ell') \leq \sum_{k} g_{ij}^k(\ell') x_{ij}^k \, \forall \, i, j, \ell' \quad \text{Equation 17}$$

is satisfied. The λ represents a penalty to ensure that the inequality constraint is satisfied. There are no additional constraints since the π(l, l') is constrained, and the ML model 160 may learn to solve this objective function using a ML model (e.g., learning via gradient descent), for example.

Before providing additional description regarding the ML model 160, the following provides additional description with respect to routing and segment routing between nodes. To route traffic on the network 154, each physical link in the network 154 may have an associated link metric (also referred to as link weight or link cost). To route from node i to node j of the network for example, the network may route traffic based on an underlay routing scheme such as shortest path (e.g., minimum weight path) or the open shortest path first (OSPF) protocol between two nodes, such as node i and node k. This shortest path may be determined using the link metrics of the physical links between the nodes i and j. For example, each node along the path between nodes i and j may examine the destination address of a packet and may then forward that packet in accordance with the shortest path (which is determined based on link metrics) to the destination node. The physical flow of traffic in the underlay routing may be indicated by $g_{ik}^k$ (l) and/or βij(l) as noted above.

In the case of segment routing as an overlay routing scheme on top of the underlay routing, the traffic is also routed based on segments. With segment routing, one or more segments between source and destination are specified from the source node to a destination node, but the physical links (or links) within a given segment may use shortest path routing. In the case of shortest path routing, the routing may also be in accordance with equal-cost multi-path routing (ECMP), for example. In ECMP, packets are forwarded to a given destination over multiple "equal" cost best paths using equal routing priority.

Figure 1B:
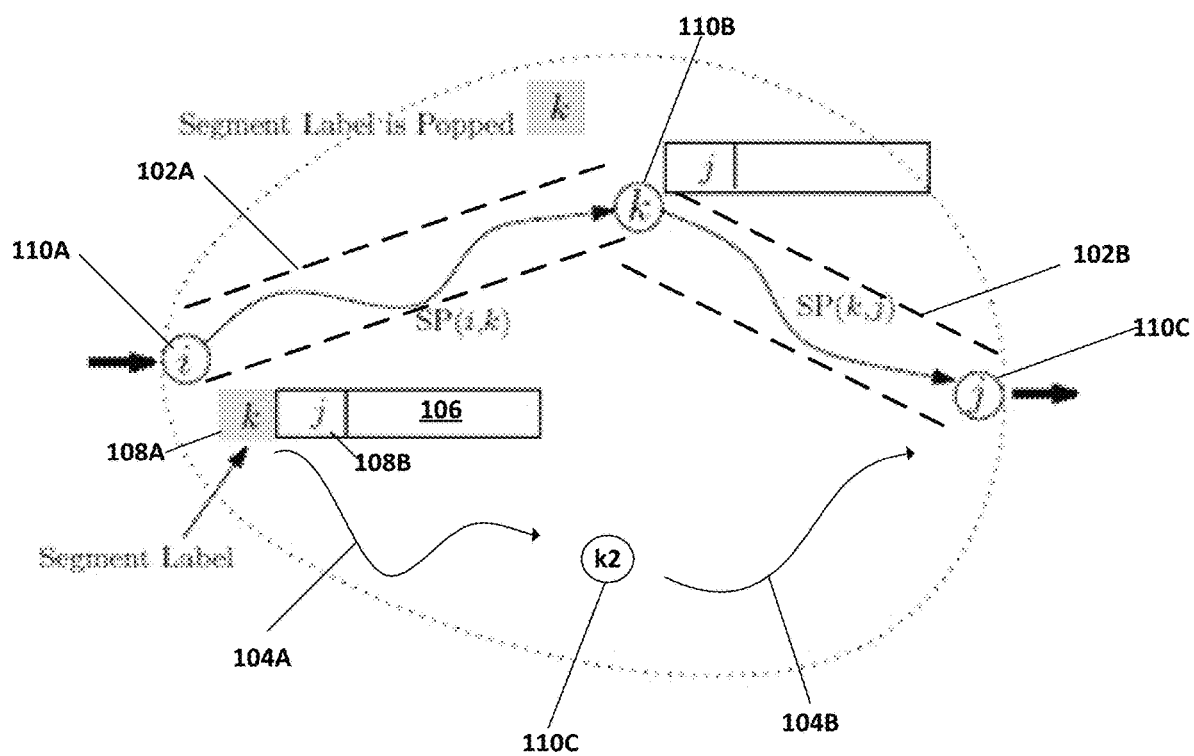
FIG. 1B depicts an example of segment routing between nodes i and j using segments, in accordance with some embodiments.

FIG. 1B depicts an example of segment routing between nodes i and j using segments. In the example of FIG. 1, there is a first segment 102A between node i 110A and node k 110B and a second segment 102B between nodes k 110B and node j 102B (wherein node k may be referred to as an intermediate or a deflection node). Within a given segment such as segment 102A or 102B, shortest path routing may be used to determine the physical links 1 (e.g., the underlying physical links) used to carry the traffic, such as the packet 106. Formally, the segment may represent a minimum weight path between a pair of nodes. For example, the segment between nodes i and j may be a minimum weight path between nodes i and j, wherein the minimum weight path is computed using the link metric.

Referring to the packet 106 at FIG. 1B, the packet includes a segment label "k" 108A and a destination address 'j' 108B. The segment label specifies to node i 110A that packet 106 is to be forwarded to destination node j 110C over the segments 102A-B but deflected via intermediate node k lion, while the physical links (within the segments) and associated link metrics may selected using a shortest path algorithm through the links of the segments 102A-n. Within each of the segments for example, shortest path routing may be used to determine the path through the physical links to carry the packet 106 to intermediate node k 110B.

To illustrate further by way of a numerical example, the flow of traffic through a segment ("segment traffic flow") between nodes i and j may be represented as follows:

$$\phi_{ij}(t) = \sum_{k} x_{kj}^i d_{kj}(t) + \sum_{k} x_{ik}^j d_{ik}(t), \quad \text{Equation 18}$$

wherein the segment traffic flow is $\phi_{ij}$ and is the total amount of traffic flow over a segment between node i and node j, the deflection parameters are $x_{kj}^i$ and $x_{ik}^j$ (also referred to above as segment routing parameters $x_{ij}^k$ and/or $\alpha_{ij}^k$), and $dk_{jk}(t)$ and $d_{ik}(t)$ are indicative of the traffic demand (which is obtained from the traffic matrix). In other words, the amount of traffic flow (which is between nodes nodes i andj) that is deflected via node k is a function of the deflection parameters and the amount of traffic flow over the segment. For example, a deflection parameter of 0.75 for $x_{ij}^k$, given a traffic demand of 10 Gigabyte between nodes i and node j, the amount of traffic flow over the segment via node k would be 7.5 Gigabytes. With respect to Equation 18, the amount of traffic flow over the segment is computed for a segment between nodes i and j, and this traffic flow takes into account that the segment might be a second hop of a two hop segment 168A and a first hop 168B of a two hop segment as shown in FIG. 1D.

Figure 2:
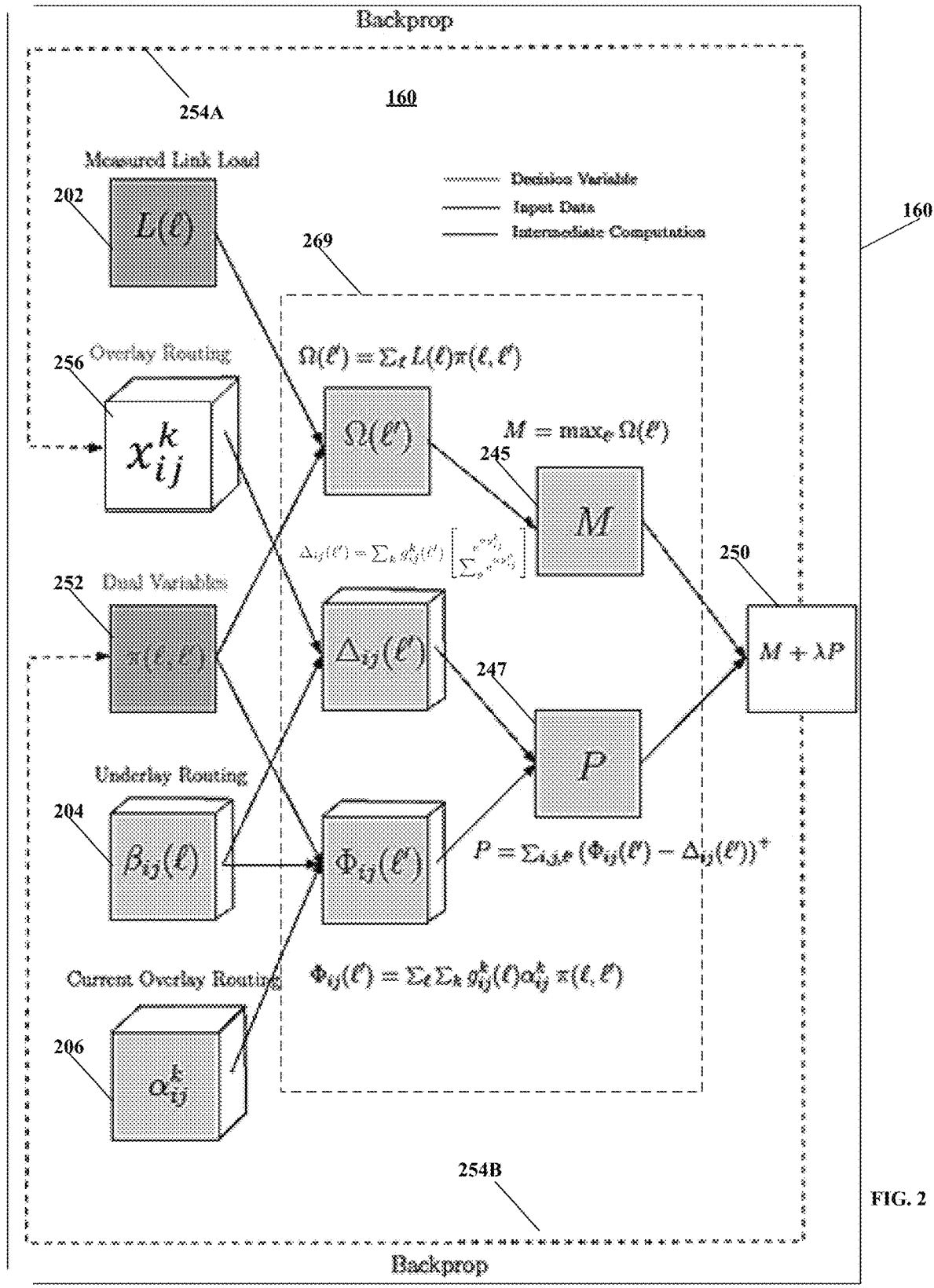
FIG. 2 depicts an example of a machine learning (ML) model, in accordance with some embodiments.

FIG. 2 depicts an example of a machine learning (ML) model 160, in accordance with some embodiments. Specifically, FIG. 2 depicts training of the ML model 160, such that the ML model determines the segment routing parameters $x_{ij}^k$ that minimize the maximum link utilization acrross any of the traffic matrices that could have resulted in a given, measured link load L(l).

At 202, the ML model 160 may receive, as an input, a measured link load that is measured for a link (e.g., a second link l) of a network, in accordance with some embodiments. For example, the machine learning model may receive a measured link load L(l) 202 for link l of the network, such as the network 154. To illustrate further, the network 154, may include one or more links, and network management system 150 including the ML model 160 may receive a link load measurement L(l) for the second link l. To illustrate further, given link l, the link load for link l may be measured as 10 megabits per second (Mbps), so in this example, the measured link load for link l is 10 Mbps (e.g., L(l)=10 Mbps). The measured link load (e.g., for one or more links if not some or all links of the network) may be measured from time to time, and reported to the network management system 150, so the most recent measured link load may be referred to as the current measured link load.

At 204, the ML model 160 may receive, as an input, information regarding an amount of flow on the link between a source node and a destination node of the network, in accordance with some embodiments. For example, the ML model 160 may receive an amount of flow, wherein the amount of flow 204 may be expressed as $\beta_{ij}(l)$, which represents the amount of flow in a link l if one unit of flow is sent from node i to node j. The l(l) thus represents the underlying topology of links and underlay routing of the network.

Referring to FIG. 1B for example, the segment 102A-B corresponds to a pair of nodes node i 110A and node j 110C with intermediate node k 110B. In this example, the segment may include one or more links (e.g., physical links), and these links may each be associated with (e.g., mapped to) link information. For example, the link information may include one or more values for $\beta_{ij}(l)$, which indicates a fractional amount of traffic carried on link l when traffic is routed on the segment from node i to node j, although the link information may include other link information as well such as capacity of a link ("link capacity) and/or other types of link information including characteristics. The amount of flow $\beta_{ij}(l)$ on link l may correspond to underlay routing parameters. Within each segment for example, minhop routing with ECMP may be used to route among the links of a segment.

Figure 1C:
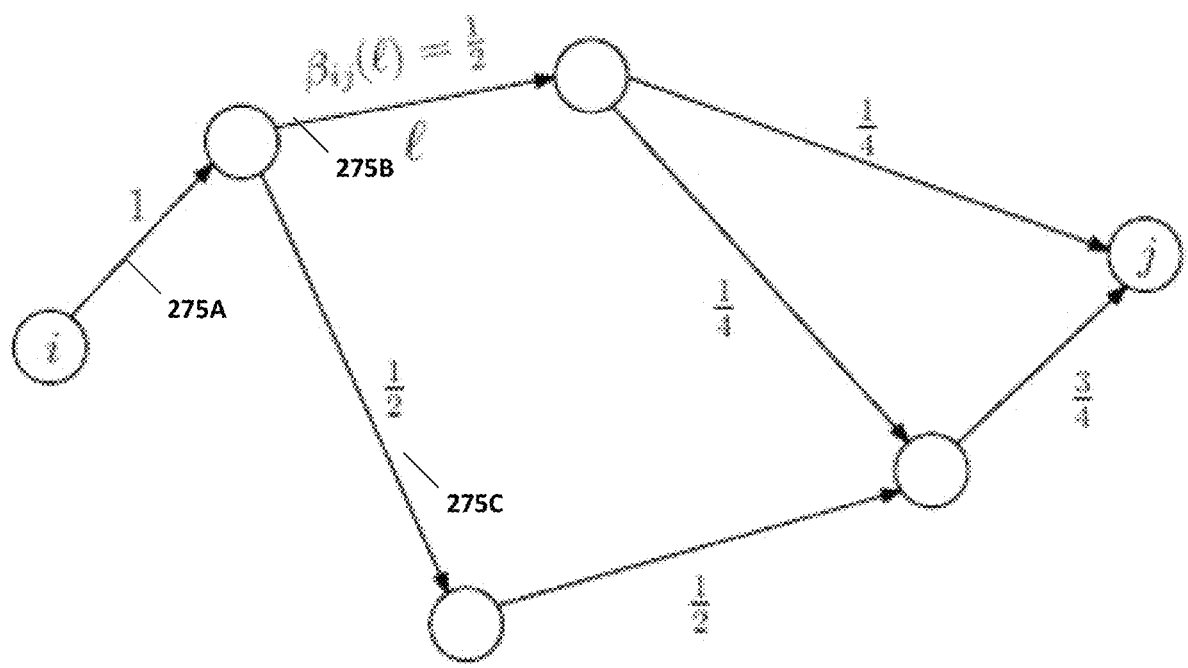
FIG. 1C depicts a single segment including a plurality of links, in accordance with some example embodiments.
Figure 1D:
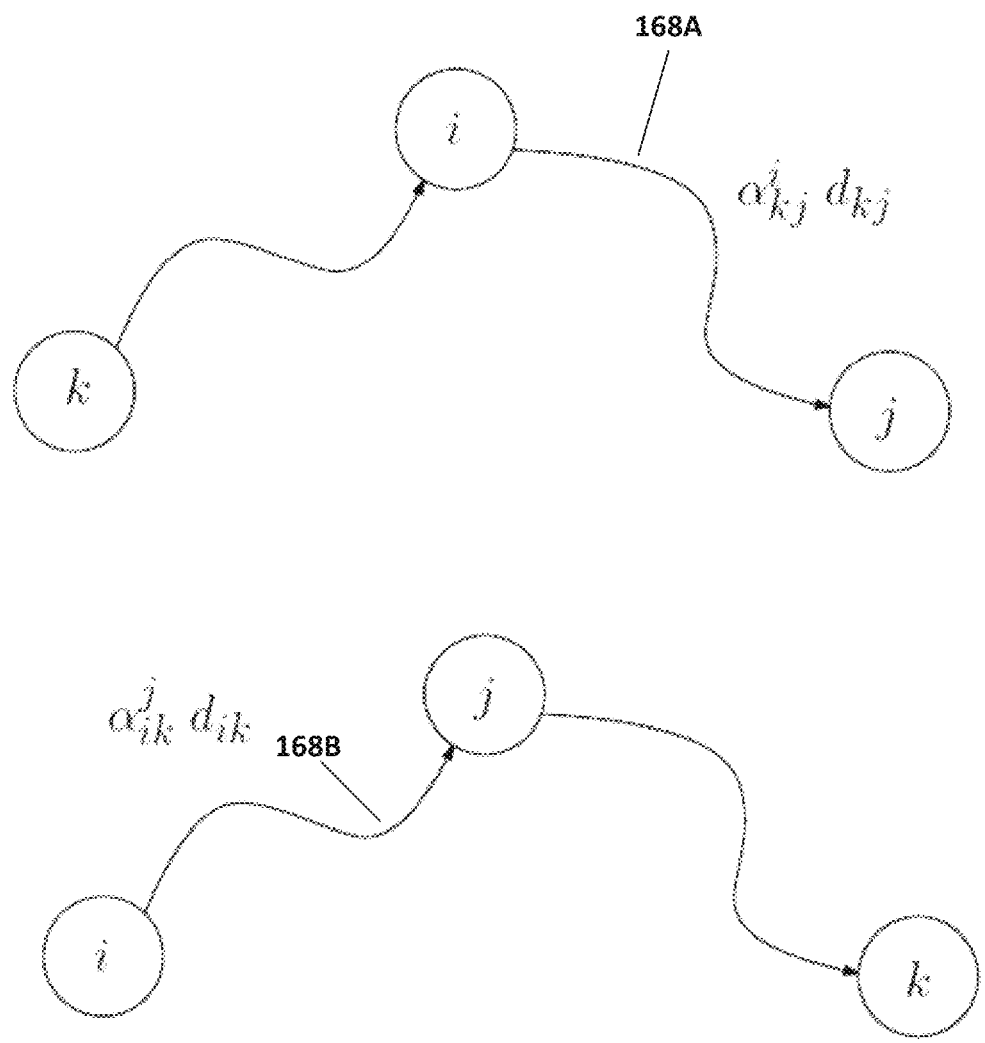
FIG. 1D depicts an example of a 2-hop segment, in accordance with some embodiments.

FIG. 1C depicts a segment between nodes i and j including a plurality of links, wherein the nodes are represented by circles and the links are represented by lines coupling the nodes. The links correspond to physical links or connections between nodes of the network, so node i can communicate with node j only if there are one or more links link between nodes i and j. The fraction (e.g., if one unit of flow is sent from node i to node j) of traffic carried by a given link is denoted by βij(l). For example, a link 275A carries all of the traffic of the segment, a link 275B carries half of the segment traffic destined for node j as the other half of the segment traffic is carried by a link 275C, and so forth (e.g., the segment to links mapping appear alongside each link). The segment to links mapping $\beta_{ij}(l)$ (e.g., 1, ½, ½, ½, ¼, ¼, and ¾) define the underlay or physical link layer flow and routing among the nodes of a segment between nodes i and j. The segment to link mapping parameters $\beta_{ij}(l)$ thus describe the underlay or physical link layer flow over the links and thus what portion of the segment traffic flow is carried by a corresponding link of a segment. In other words, βij(l) indicates the fraction of traffic from source i to destination j that is routed on a given link l, such as link l 275A, link C 275B, and so forth.

Referring again to FIG. 2, the ML model 160 may receive, as an input, at least one deflection parameter as shown at 206, in accordance with some embodiments. The deflection parameter (also referred above as segment routing parameters $x_{ij}^k$ and/or $\alpha_{ij}^k$) indicates a fractional amount of traffic that is carried over the segment (e.g., overlay routing) between the source node and the destination node and deflected through an intermediary node. For example, the deflection parameter 206 (which may also be referred to as a segment routing parameter or scheme) may be denoted by $\alpha_{ij}^k$, wherein i is the source node, j is the destination node, and k is the intermediate node. To illustrate further, the deflection parameter may indicate the current overlay (or segment) routing between source node j and the destination node k which is deflected (or routed) via is the intermediate node k.

Given the inputs at 202, 204, and 206, the ML model 160 may learn a first output comprising a new or updated deflection parameter (where the new deflection parameter indicates a fractional amount of traffic that is to be carried between the source node and the destination node and deflected through an intermediate node over a segment) and may learn as a second output the dual variables. For example, ML model may minimize the objective function at 250 and the output is feedback at 254A/254B as part of back propagation to learn a new or updated deflection parameter at 256 and feedback 254B as part of back propagation to learn the dual variables π (l, l'). In other words, the output at 250 is used to allow the ML model 160 to learn the deflection parameter(s) (e.g., segment routing parameters $x_{ij}^k$) and the dual variables π (l, l'), wherein the deflection parameter(s) define the routing scheme (e.g., routing scheme using the "overlay" segments) of the network.

The ML model's 160 objective function at 250 corresponds to the following Equation 19
$$\min_{\ell'} \max \sum_{\ell} L(\ell)\pi(\ell, \ell') + \lambda \sum_{i,j} \left( \sum_{\ell,k} g_{ij}^k(\ell) \alpha_{ij}^k \pi(\ell, \ell') - \sum_k g_{ij}^k(\ell') \left[ \frac{e^{\alpha x_{ij}^k}}{\sum_p e^{\alpha x_{ij}^p}} \right] \right)^+,$$

wherein the M 245 at FIG. 2 denotes given a measured link load L(l), a minimum of the dual variables π(l, l') is represented as follows Equation 20
$$\min_{\ell'} \max \sum_{\ell} L(\ell)\pi(\ell, \ell'),$$

and P 247 at FIG. 2 corresponds to the penalty noted above which is $$\lambda \sum_{i,j} \left( \sum_{\ell,k} g_{ij}^k(\ell) \alpha_{ij}^k \pi(\ell, \ell') - \sum_k g_{ij}^k(\ell') \left[ \frac{e^{\alpha x_{ij}^k}}{\sum_p e^{\alpha x_{ij}^p}} \right] \right)^+ . \quad \text{Equation 21}$$

In other words, the learning by the ML model learns the first output (which corresponds to $x_{ij}^k$ (of Equation 19) and provides new or updated deflection parameter(s)) and learns the second output (which corresponds to the dual variables $\pi$ (l, l')).

The dual variables $\pi$ (l, l') of Equations 19 and 20 are used in the objective function for the ML model 160 and are derived, as noted above, from the primal, maximization objective functions of Equations 4-5). Moreover, the dual variables $\pi$ (l, l') are a function of link pairs l, l'. For example, if there are 20 links l in the network, there are 20 by 20 (e.g., 400) link pairs l, l'. The use of link pairs l and l' in the network are used to enable the solution set to converge, so given that that there an infinite number of traffic matrices that could have generated the measured link load L(l), the link pairs l and l' enable the ML model to find a solution. In other words, the dual variables $\pi$(l, l') provides in a sense a surrogate for the worst case traffic matrices that could load link l' while confirming to the traffic flow on measured link load L(l). As noted, link l is a link l or which we have a link load measurement, while l' is another link l or which we are attempting to minimizes the maximum link load for any traffic matrix in P($\alpha$, g, L).

The first output 254A and the second output 254B are used as part of learning at 254A-B (which in this example is an ML model 160 using backpropagation), so the ML model 160 re-iterates using the new or updated $x_{ij}^k$ as the overlay deflection parameter at 256 and using another link pair (l, l') for the dual variables $\pi$ (l, l') at 252. The first and second outputs are using backpropagation to update the values of $x_{ij}^k$ and $\pi$ (l, l'), such that the objective function decreases. In this way, the ML model converges to until the ML model determines the routing parameters $x_{ij}^k$ that minimize a maximum link utilization for any traffic matrix that could have resulted in the measured link load L(l).

Referring again to Equation 21, the only unknown variable is $x_{ij}^k$, so the ML model 160 may use Equation 21 as a loss (or an objective function), so the only unknown variable can be adjusted by the ML learning model 160 to affect the outcome is the deflection parameter $x_{ij}^k$. For example, backpropagation and gradient descent may be used to train the ML model by updating the weights of the ML model to minimize the loss function, such as Equation 21.

FIG. 3 depicts an example of a process for training of a ML model so that the ML model learns a routing scheme, in accordance with some embodiments. In the example of FIG. 3, a ML model 160, such that the ML model 160, is trained to determine the segment routing parameters $x_{ij}^k$ that minimize the maximum link utilization across any of the traffic matrices that could have resulted in a given, measured link load L(l).

At 305, a ML model may receive, as a first input, a measured link load that is measured for a link (e.g., a second link l) of a network, in accordance with some embodiments. For example, the ML model 160 may receive, as a first input, a measured link load L(l) as shown at FIG. 2 202 for at least a link l of the network 154.

At 307, the ML model may receive, as a second input, information regarding a network topology of the network. For example, the network topology can be denoted by an amount of flow in one or more links of the network caused by one unit of flow sent between two nodes of the network. To illustrate further, the ML model 160 depicted at FIG. 2 may receive, as a second input, the information regarding the network topology of the network as an amount of flow, such as $\beta_{ij}$(l). As noted above with respect to FIG. 1C, the amount of flow, such as $\beta_{ij}$(l) indicates not only the topology of the network but also the underlay routing for links within a segment. In the example of FIG. 1C, the fractional amounts indicate the amount of flow sent between node i and node j caused by one unit of flow sent between two nodes of the network, so for example a link 275B carries half of the flow between node i and node j (while a link having a $\beta_{ij}$(l) of zero carries no flow and is thus not part of the topology and routing between node i and node j).

At 309, the ML model may receive, as a third input, at least one deflection parameter, wherein the at least one deflection parameter indicates a fractional amount of traffic that is currently being carried between the source node and the destination node and deflected through an intermediary node, in accordance with some embodiments. For example, the ML model 160 may receive, as a third input, at least one deflection parameter, such as $x_{ij}^k$, as noted above at 206, wherein i is the source node, j is the destination node, and k is the intermediate node. As noted above with respect to FIG. 1B, the deflection parameter(s) represent the overlay or segment routing parameters currently being used on the network.

At 311, the ML model may learn a first output that provides at least one updated deflection parameter, wherein the at least one updated deflection parameter indicates the fractional amount of traffic that is to be carried between the source node and the destination node and deflected through the intermediate node, in accordance with some embodiments. For example, the ML model 160 may learn a first output comprising a new or updated deflection parameter $x_{ij}^k$ (of Equation 19). To illustrate further, given the inputs at 202, 204, and 206, the ML model may minimize an objective function at 250 (see, also, e.g., Equation 19) and the output at 260 is feedback 254A as part of back propagation to provide (as part of the learning via gradient descent) a new or updated deflection parameter $x_{ij}^k$ at 256. This deflection parameter $x_{ij}^k$ provide a routing scheme or parameter for segment routing on the network.

At 313, the ML model may learn a second output to provide dual variables that serve as a surrogate for a traffic matrix that could have generated the measured link load that is measured for the at least one link of a network, in accordance with some embodiments. For example, the ML model 160 may learn a second output comprising the dual variables $\pi$ (l, l'). The dual variables $\pi$ (l, l') provide a substitute for the traffic matrix during the optimization. To illustrate further, given the inputs at 202, 204, and 206, the ML model may minimize the objective function at 250 (see, e.g., Equation 19) and the output is feedback 254B as part of back propagation to provide (as part of the learning via gradient descent) an updated dual variables $\pi$ (l, l') at 256, for example. As noted above, the updated dual variables serve as a surrogate for the traffic matrices that provide a minimum of a maximum link utilization of a first link (l') given the measured link load for a second link (l). In short, the learning at 311 and 312 is used to determine (given at least the measured link load L(l) on link l) a segment routing scheme (e.g., one or more segment routing parameters $x_{ij}^k$) that minimizes a maximum link utilization across, or for any, traffic matrix that could have resulted in the measured link load L(l) on link l) using the dual variables $\pi$ (l, l').

The learning at 311 and 313 uses an objective function (M+ΔP) at 250 comprising the dual variables π (l, l'), the at least one deflection parameter, the measured link load, and a penalty (P at 247) that enforces at least one constraint (e.g., λ as noted at Equation 17) on the dual variables.

After the learning provides the the at least one deflection parameter and the dual variables, the learning repeats to generate additional deflection parameters and dual variables until the objective function at 254 converges and thus provide an optimum set of deflection parameters for the links of the network (e.g., optimum in the sense that they provide a minimum of a maximum link utilization of a first link (l') given the measured link load for a second link (l)). In other words, the ML learns and outputs an optimum set of deflection parameters that define s overlay or segment routing over the network. Moreover, when the dual variables are updated as part of learning the updated dual variables use a different pair of links for the first link (l') and the second link (l).

In the example of FIG. 2, the first layer of the ML model 160 includes an input layer, such as the first input comprising the measured link load 202, the second input comprising the information regarding an amount of flow (e.g., $\beta_{ij}(l)$), a third input comprising the at least one deflection parameter (e.g., $x_{ij}^k$ and/or $\alpha_{ij}^k$). The input layer may also include the dual variables 252 and the the new or updated $x_{ij}^k$ k as the overlay deflection parameter 256. The output layer of the ML model 160 comprises the objective function (M+λP) at 250. The intermediate layer 269 determines, as noted, intermediate results used for the (M+λP) at 250.

Figure 4:
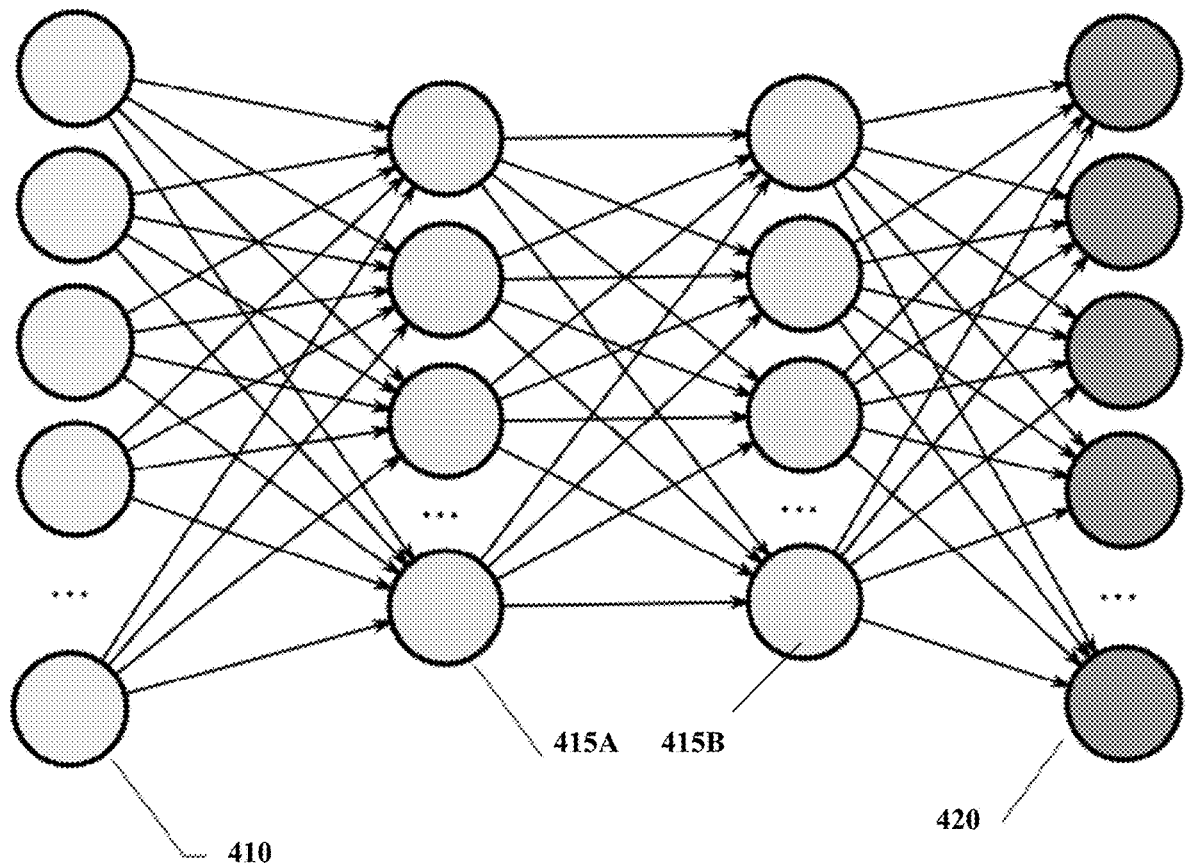
FIG. 4 depicts an example of a ML model, in accordance with some embodiments.

FIG. 4 depicts an example of a ML model 400, in accordance with some embodiments. The ML model 400 may be used as the ML model 160. The input layer 410 may include a node for each node in the network. The ML model may include one or more hidden layers 415A-B (also referred to as intermediate layers) and an output layer 420. The machine learning model 400 may be comprised in a network node, a user equipment, and/or other computer-based system. Alternatively, or additionally, the ML model may be provided as a service, such as a cloud service (accessible at a computing system such as a server via a network such as the Internet or other type of network).

Figure 5:
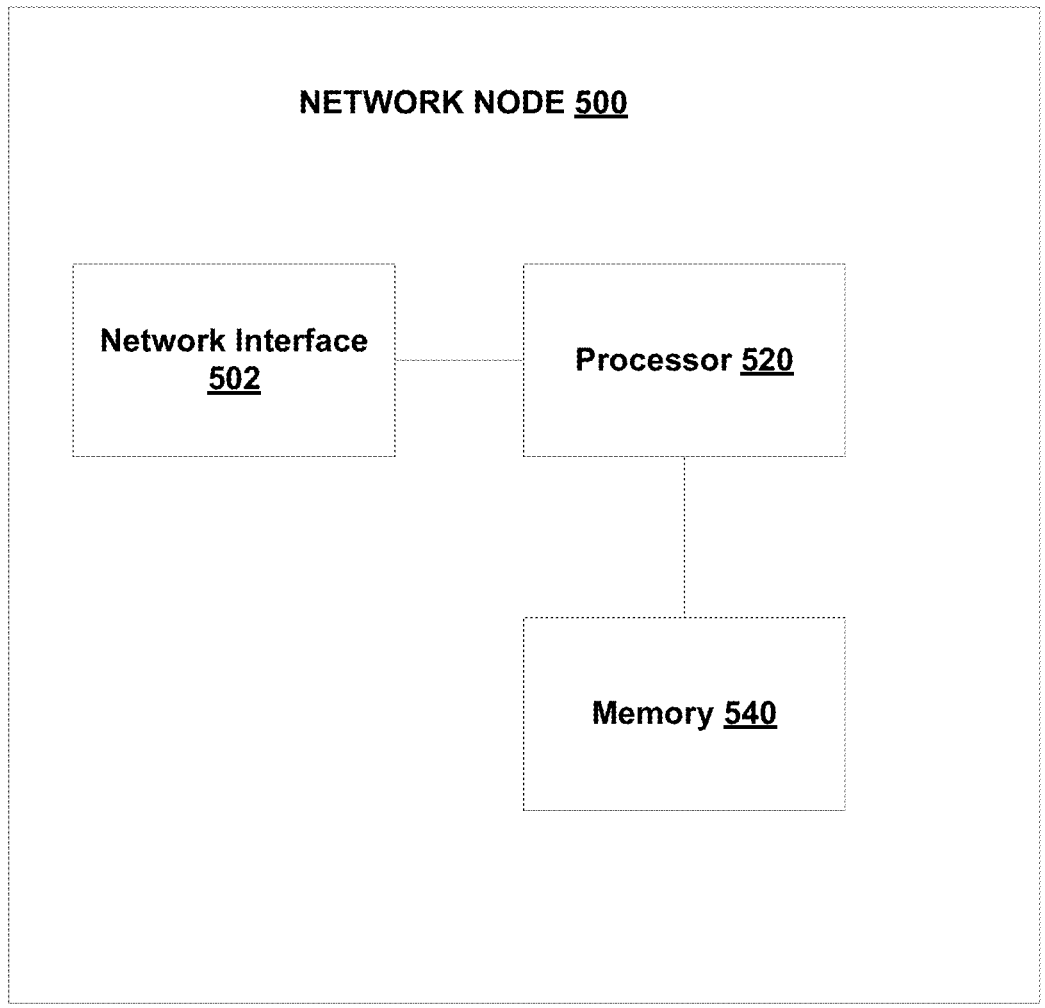
FIG. 5 depicts an example of a network node, in accordance with some embodiments.

FIG. 5 depicts a block diagram of a network node 500, in accordance with some embodiments. As noted, the machine learning model 400 or 160 (and/or the network management system 150) may be comprised in a network node. The network node 500 may comprise or be comprised in one or more network side nodes or functions.

The network node 500 may include a network interface 502, a processor 520, and a memory 504, in accordance with some embodiments. The network interface 502 may include wired and/or wireless transceivers to enable access other nodes including base stations, other network nodes, the Internet, other networks, and/or other nodes. The memory 504 may comprise volatile and/or non-volatile memory including program code, which when executed by at least one processor 520 provides, among other things, the processes disclosed herein. For example, the network management system 150 and/or ML model 160 may be comprised in a network node.

Figure 6:
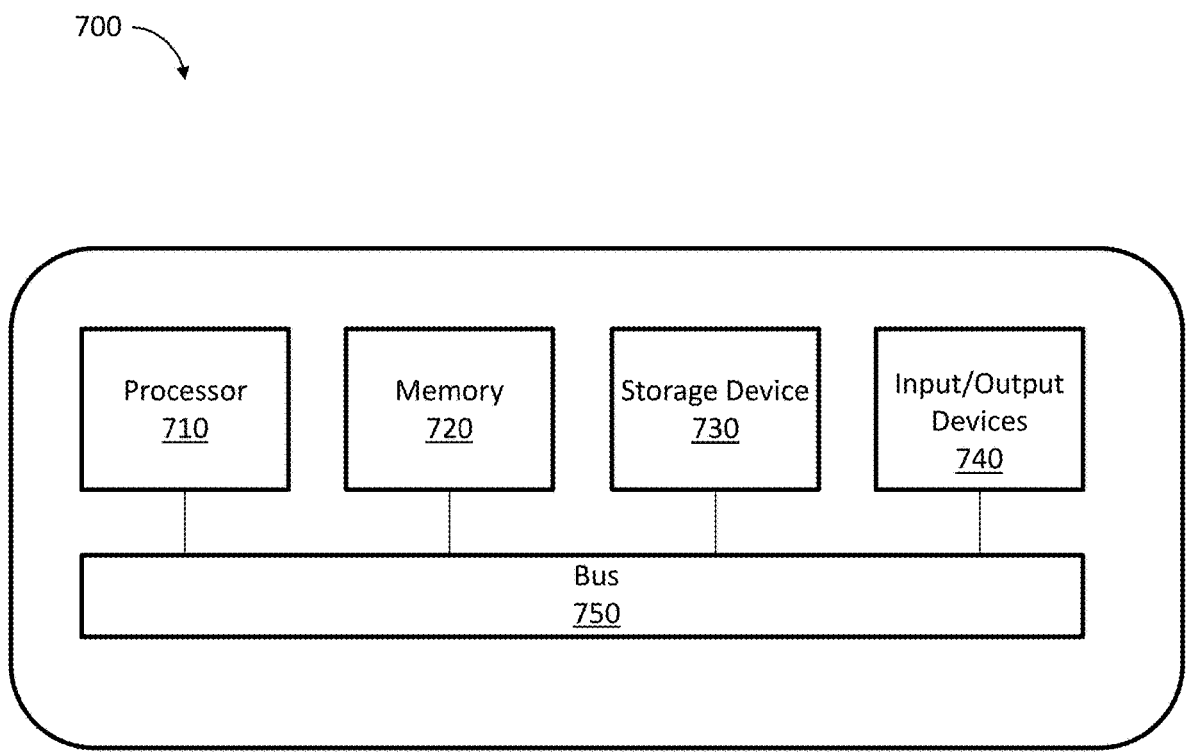
FIG. 6 depicts an example of a computing system, in accordance with some embodiments.

FIG. 6 depicts a block diagram illustrating a computing system 700, in accordance with some embodiments. For example, the network management system 150 and/or ML model 160 (or 400) may be comprised the system 700. As shown in FIG. 6, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. In some implementations of the current subject matter, the processor 710 can be a single-threaded processor. Alternately, the processor 710 can be a multi-threaded processor. The process may be a multi-core processor have a plurality or processors or a single core processor. Alternatively, or additionally, the processor 710 can be a graphics processor unit (GPU), an AI chip, and/or the like. The processor 710 is capable of processing instructions stored in the memory 720 and/or on the storage device 730 to display graphical information for a user interface provided via the input/output device 740. The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces. According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

Without in any way limiting the scope, interpretation, or application of the claims appearing below, a technical effect of one or more of the example embodiments disclosed herein may include enhanced optimization of networks, so networks can more efficiently route traffic (using, for example, routing parameters for segment routing). Alternatively, or additionally, a technical effect of one or more of the example embodiments disclosed herein may include enhanced speed with respect to learning and/or determination of routing parameters for segment routing.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1: A method comprising: receiving, as a first input to a machine learning model, a measured link load that is measured for a link of a network; receiving, as a second input to the machine learning model, information indicating a network topology of the network; receiving, as a third input to the machine learning model, at least one deflection parameter, wherein the at least one deflection parameter indicates a fractional amount of traffic that is currently being carried between a source node and a destination node and deflected through an intermediary node; learning, by the machine learning model, a first output to provide at least one updated deflection parameter, wherein the at least one updated deflection parameter indicates the fractional amount of traffic that is to be carried between the source node and the destination node and deflected through the intermediate node; and learning, by the machine learning model, a second output to provide dual variables that serve as a surrogate for a traffic matrix that could have generated the measured link load that is measured for the link of the network.

Example 2: The method of Example 1, wherein the network topology represents an amount of flow in one or more links of the network, the amount of flow caused by one unit of flow sent between two nodes of the network.

Example 3: The method of any of Examples 1-2, wherein the learning of the first output and second output minimizes an objective function comprising the dual variables, the at least one deflection parameter, the measured link load, and a penalty that enforces at least one constraint on the dual variables, and/or wherein the minimization of the objective function provides a set of deflection parameter for segment routing over the network.

Example 4: The method of any of Examples 1-3 further comprising: repeating the learning of the first output using the at least one updated deflection parameter as the third input.

Example 5: The method of any of claims 1-4, wherein the dual variables serve as a surrogate for at least one traffic matrix that provides a minimum of a maximum link utilization of a first link given the measured link load for a second link.

Example 6: The method of any of claims 1-5 further comprising: repeating the learning of the second output to provide an update to the dual variables, the updated dual variables using a different pair of links for the first link and the second link.

Example 7: The method of any of claims 1-6, wherein the machine learning model includes a first layer of inputs that receive at least the first input, the second input, and the third input, an intermediate layer, and an output layer comprising an objective function.

Example 8: An apparatus comprising: at least one processor; and at least one memory including instructions which when executed by the at least one processor causes operations comprising: receiving, as a first input to a machine learning model, a measured link load that is measured for a link of a network; receiving, as a second input to the machine learning model, information indicating a network topology of the network; receiving, as a third input to the machine learning model, at least one deflection parameter, wherein the at least one deflection parameter indicates a fractional amount of traffic that is currently being carried between a source node and a destination node and deflected through an intermediary node; learning, by the machine learning model, a first output to provide at least one updated deflection parameter, wherein the at least one updated deflection parameter indicates the fractional amount of traffic that is to be carried between the source node and the destination node and deflected through the intermediate node; and learning, by the machine learning model, a second output to provide dual variables that serve as a surrogate for a traffic matrix that could have generated the measured link load that is measured for the link of the network.

Example 9: The apparatus of Example 8, wherein the network topology represents an amount of flow in one or more links of the network, the amount of flow caused by one unit of flow sent between two nodes of the network.

Example 10: The apparatus of any of Examples 8-9, wherein the learning of the first output and second output minimizes an objective function comprising the dual variables, the at least one deflection parameter, the measured link load, and a penalty that enforces at least one constraint on the dual variables, and/or wherein the minimization of the objective function provides a set of deflection parameter for segment routing over the network.

Example 11: The apparatus any of Examples 8-10 wherein the operations further comprise: repeating the learning of the first output using the at least one updated deflection parameter as the third input.

Example 12: The apparatus any of Examples 8-11, wherein the dual variables serve as a surrogate for at least one traffic matrix that provides a minimum of a maximum link utilization of a first link given the measured link load for a second link.

Example 13: The apparatus any of Examples 8-12 further comprising: repeating the learning of the second output to provide an update to the dual variables, the updated dual variables using a different pair of links for the first link and the second link.

Example 14: The apparatus of any of Examples 8-13, wherein the machine learning model includes a first layer of inputs that receive at least the first input, the second input, and the third input, an intermediate layer, and an output layer comprising an objective function.

Example 15: A non-transitory computer-readable storage medium including instructions which when executed by at least one processor causes operations comprising: means for receiving, as a first input to a machine learning model, a measured link load that is measured for a link of a network; means for receiving, as a second input to the machine learning model, information indicating a network topology of the network; means for receiving, as a third input to the machine learning model, at least one deflection parameter, wherein the at least one deflection parameter indicates a fractional amount of traffic that is currently being carried between a source node and a destination node and deflected through an intermediary node; means for learning, by the machine learning model, a first output to provide at least one updated deflection parameter, wherein the at least one updated deflection parameter indicates the fractional amount of traffic that is to be carried between the source node and the destination node and deflected through the intermediate node; and means for learning, by the machine learning model, a second output to provide dual variables that serve as a surrogate for a traffic matrix that could have generated the measured link load that is measured for the link of the network.

Example 16: An apparatus comprising: means for receiving, as a first input to a machine learning model, a measured link load that is measured for a link of a network; means for receiving, as a second input to the machine learning model, information indicating a network topology of the network; means for receiving, as a third input to the machine learning model, at least one deflection parameter, wherein the at least one deflection parameter indicates a fractional amount of traffic that is currently being carried between a source node and a destination node and deflected through an intermediary node; means for learning, by the machine learning model, a first output to provide at least one updated deflection parameter, wherein the at least one updated deflection parameter indicates the fractional amount of traffic that is to be carried between the source node and the destination node and deflected through the intermediate node; and means for learning, by the machine learning model, a second output to provide dual variables that serve as a surrogate for a traffic matrix that could have generated the measured link load that is measured for the link of the network.

Example 17: The apparatus of claim 16 further comprising means for performing any of the functions recited in any of claims 1-7.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
   receiving, as a first input to a machine learning model, a measured link load that is measured for a link of a network;
   receiving, as a second input to the machine learning model, information indicating a network topology of the network;
   receiving, as a third input to the machine learning model, at least one deflection parameter, wherein the at least one deflection parameter indicates a fractional amount of traffic that is currently being carried between a source node and a destination node and deflected through an intermediary node;
   learning, by the machine learning model, a first output to provide at least one updated deflection parameter, wherein the at least one updated deflection parameter indicates the fractional amount of traffic that is to be carried between the source node and the destination node and deflected through the intermediate node; and
   learning, by the machine learning model, a second output to provide dual variables that serve as a surrogate for a traffic matrix that could have generated the measured link load that is measured for the link of the network.

2. The method of claim 1, wherein the network topology represents an amount of flow in one or more links of the network, the amount of flow caused by one unit of flow sent between two nodes of the network.

3. The method of claim 1, wherein the learning of the first output and second output minimizes an objective function comprising the dual variables, the at least one deflection parameter, the measured link load, and a penalty that enforces at least one constraint on the dual variables, and/or wherein the minimization of the objective function provides a set of deflection parameter for segment routing over the network.

4. The method of claim 1 further comprising:
   repeating the learning of the first output using the at least one updated deflection parameter as the third input.

5. The method of claim 1, wherein the dual variables serve as a surrogate for at least one traffic matrix that provides a minimum of a maximum link utilization of a first link given the measured link load for a second link.

6. The method of claim 5 further comprising:
   repeating the learning of the second output to provide an update to the dual variables, the updated dual variables using a different pair of links for the first link and the second link.

7. The method of claim 1, wherein the machine learning model includes a first layer of inputs that receive at least the first input, the second input, and the third input, an intermediate layer, and an output layer comprising an objective function.

8. An apparatus comprising:
   at least one processor; and
   at least one memory including instructions which when executed by the at least one processor causes operations comprising:
      receiving, as a first input to a machine learning model, a measured link load that is measured for a link of a network;
      receiving, as a second input to the machine learning model, information indicating a network topology of the network;
      receiving, as a third input to the machine learning model, at least one deflection parameter, wherein the at least one deflection parameter indicates a fractional amount of traffic that is currently being carried between a source node and a destination node and deflected through an intermediary node;
      learning, by the machine learning model, a first output to provide at least one updated deflection parameter, wherein the at least one updated deflection parameter indicates the fractional amount of traffic that is to be carried between the source node and the destination node and deflected through the intermediate node; and learning, by the machine learning model, a second output to provide dual variables that serve as a surrogate for a traffic matrix that could have generated the measured link load that is measured for the link of the network.

9. The apparatus of claim 8, wherein the network topology represents an amount of flow in one or more links of the network, the amount of flow caused by one unit of flow sent between two nodes of the network.

10. The apparatus of claim 8, wherein the learning of the first output and second output minimizes an objective function comprising the dual variables, the at least one deflection parameter, the measured link load, and a penalty that enforces at least one constraint on the dual variables, and/or wherein the minimization of the objective function provides a set of deflection parameter for segment routing over the network.

11. The apparatus of claim 8, wherein the operations further comprise:

repeating the learning of the first output using the at least one updated deflection parameter as the third input.

12. The apparatus of claim 8, wherein the dual variables serve as a surrogate for at least one traffic matrix that provides a minimum of a maximum link utilization of a first link given the measured link load for a second link.

13. The apparatus of claim 12 further comprising:

repeating the learning of the second output to provide an update to the dual variables, the updated dual variables using a different pair of links for the first link and the second link.

14. The apparatus of claim 8, wherein the machine learning model includes a first layer of inputs that receive at least the first input, the second input, and the third input, an intermediate layer, and an output layer comprising an objective function.

15. A non-transitory computer-readable storage medium including instructions which when executed by at least one processor causes operations comprising:

means for receiving, as a first input to a machine learning model, a measured link load that is measured for a link of a network;

means for receiving, as a second input to the machine learning model, information indicating a network topology of the network;

means for receiving, as a third input to the machine learning model, at least one deflection parameter, wherein the at least one deflection parameter indicates a fractional amount of traffic that is currently being carried between a source node and a destination node and deflected through an intermediary node;

means for learning, by the machine learning model, a first output to provide at least one updated deflection parameter, wherein the at least one updated deflection parameter indicates the fractional amount of traffic that is to be carried between the source node and the destination node and deflected through the intermediate node; and means for learning, by the machine learning model, a second output to provide dual variables that serve as a surrogate for a traffic matrix that could have generated the measured link load that is measured for the link of the network.

16. An apparatus comprising:

means for receiving, as a first input to a machine learning model, a measured link load that is measured for a link of a network;

means for receiving, as a second input to the machine learning model, information indicating a network topology of the network;

means for receiving, as a third input to the machine learning model, at least one deflection parameter, wherein the at least one deflection parameter indicates a fractional amount of traffic that is currently being carried between a source node and a destination node and deflected through an intermediary node;

means for learning, by the machine learning model, a first output to provide at least one updated deflection parameter, wherein the at least one updated deflection parameter indicates the fractional amount of traffic that is to be carried between the source node and the destination node and deflected through the intermediate node; and means for learning, by the machine learning model, a second output to provide dual variables that serve as a surrogate for a traffic matrix that could have generated the measured link load that is measured for the link of the network.

\* \* \* \* \*